March 11, 1952     J. A. MAXWELL     2,588,643
AUTOMOBILE BODY FRONT PILLAR
Filed June 13, 1947     2 SHEETS—SHEET 1

INVENTOR.
John A. Maxwell.
BY
Harness, Dickey & Pierce
ATTORNEYS.

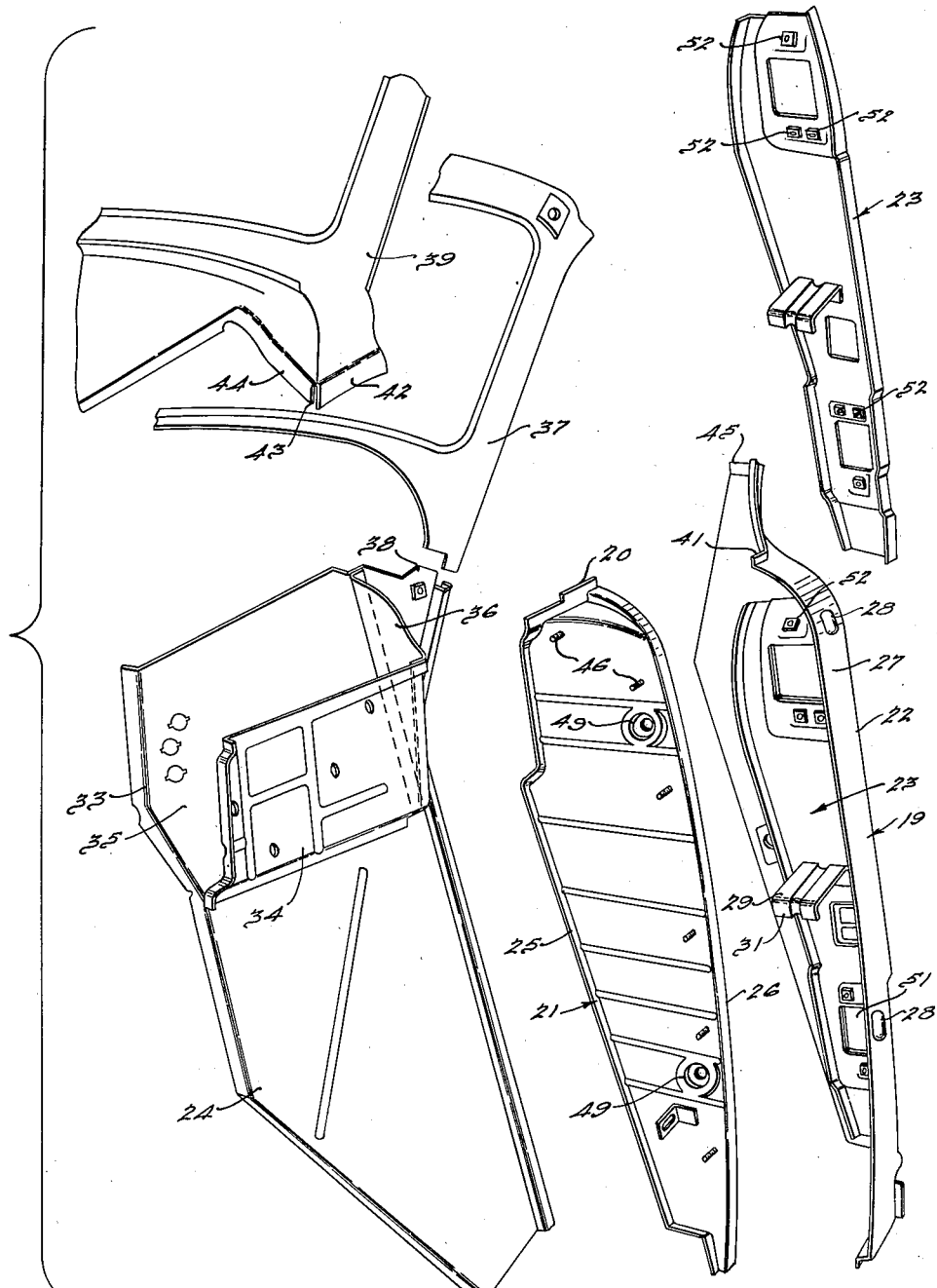

Patented Mar. 11, 1952

2,588,643

UNITED STATES PATENT OFFICE 2,588,643

AUTOMOBILE BODY FRONT PILLAR

John A. Maxwell, Detroit, Mich., assignor to Kaiser-Frazer Corporation, Willow Run, Mich., a corporation of Nevada Application June 13, 1947, Serial No. 754,401

2 Claims. (Cl. 296—28)

This invention relates to automobiles and particularly to the front pillar and hood hinge supporting structure therefor.

In the automobile of the present invention, the belt line of the body is carried forwardly and rearwardly in continuation of the fender line to have the top and side walls of the fender blend with the door and pillar formations below the belt of the body. The structure below the belt line bulges outwardly and downwardly in the plane of the front and rear fenders. The front pillar or A post below the belt line is of considerable width, extending from the sides of the cowl outwardly to the bulge in the door and the fender. The pillar portion below the belt line is of box section structure of such thickness to provide an outer wall for receiving the rear edge of the fender and the forward edge of the door which are disposed in aligned relation to each other. The pillar portion below the belt line forms no portion of the outer surface of the body. To this lower portion of the A post the windshield panel, the windshield reinforcing panel, and the roof rail, are joined in unit relation by welding, brazing and the like. The sides of the cowl panel adjacent to the top are offset inwardly and a hinge supporting bracket is offset outwardly therefrom providing a space for the hood hinge plates between the brackets and the offset cowl portions. The bracket is secured to the adjacent face of the lower portion of the A post to provide reinforcement between the cowl side panels, the brackets and the A posts.

Accordingly, the main objects of the invention are: to provide a vehicle body with doors at the sides which bulge outwardly below the belt line to be in continuation of the front and rear fenders from the belt line downwardly to the bottom of the automobile; to form an A post below the belt line from spaced front and rear stampings joined together by an outer flange and secured to the rear edge and side of the cowl panel to form a box-section construction therewith; to provide a hollow box-section structure below the windshield portion of the A post which is braced to the cowl by a hood hinge supporting bracket, and which has an outer web which is covered by the rear end of the front fender and the forward edge of the front door; to offset the top side walls of a cowl inwardly toward each other and secure thereto outwardly disposed brackets to provide recesses for the reception of supporting plates of hood hinges; and, in general, to provide an automobile having the belt line extending from the forward to the rear end thereof which is simple in construction and economical to manufacture.

Other objects and features of novelty of the invention will be specifically pointed out or will become apparent when referring, for a better understanding of the invention, to the following description taken in conjunction with the accompanying drawings, wherein:

Fig. 4 is an exploded view of the elements forming the pillar, windshield and hinge support of the automobile illustrated in Fig. 2.

Figure 1:
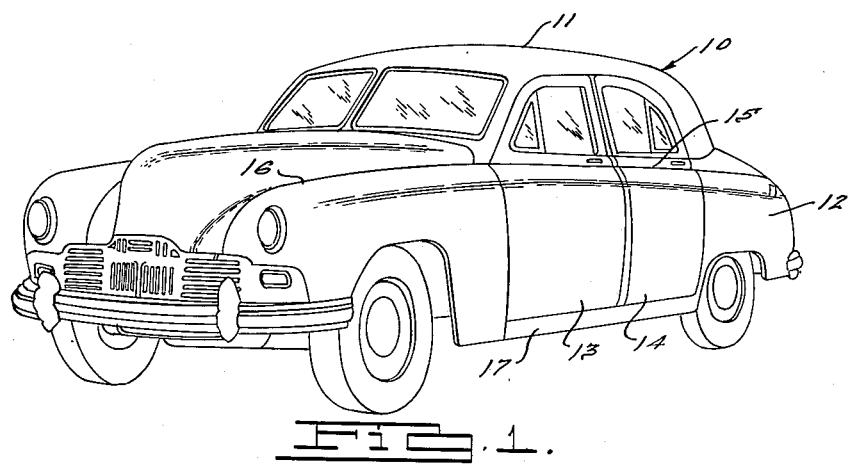
Figure 1 is a perspective view of an automobile having a body and fenders thereon embodying features of this invention.

In Fig. 1, an automobile 10 is illustrated comprising a body 11 having rear fenders 12 formed in the side quarter panels of the body and having doors 13 and 14 bulging outwardly below the belt line 15 in alignment with the fender 12. Front fenders 16 are disposed in continuation of the belt line 15 with the sides aligned with the bulge in the doors 13 and 14 to form a continuous sweeping surface from the front to the rear of the automobile.

The body has panel portions 17 below the doors secured in continuation of the fender portions 12 of the side quarter panels and extending forwardly to the rear edge of the front fenders 16. The wheel housings associated with the fender portions 12 of the side quarter panels extend rearwardly of the rear door opening to thereby eliminate the dog leg heretofore provided in the rearmost pillars and in the door. This substantially enhances the appearance of the body and at the same time permits the seat and back cushion to extend laterally the full width of the space between the doors and the inner body panels in alignment therewith. This specific construction is illustrated in the co-pending application of Howard A. Darrin, Serial No. 747,634, filed May 13, 1947, and assigned to the assignee of the present invention.

The front pillar or A post of the body is of unique construction below the belt line, extending outwardly and formed to support the rear end of the fender 16 and the front end of the door 13 so that the surfaces will be in aligned relation. The A post 18 below the belt line embodies a box-section portion 19 made up of a front stamping 21, a rear stamping 22, a reinforcing stamping 23, and a side cowl panel 24. The front panel 21 has a forwardly extending flange 25 along the inner and bottom edges, a rearwardly extending flange 26 along the front edge, and a transverse flange 20 along the top. The rear stamping 22 has a forwardly extending flange 27 which overlaps the flange 26 on the front stamping 21 and provides a support for the rear edge of the front fender and the front edge of the front door. Embossed projections 28 are provided on the flange 27 upon which the fender and door are aligned. The reinforcing plate 23 is secured to the stamping 22 and provides reinforcement for the stamping and a support for the hinges of the door 13. A brace 29 is secured to the reinforcing element 23 having a downwardly projecting end 31 which is welded to the stamping 21 to space and reinforce the two stampings medially of the ends.

Figures 2, 3:
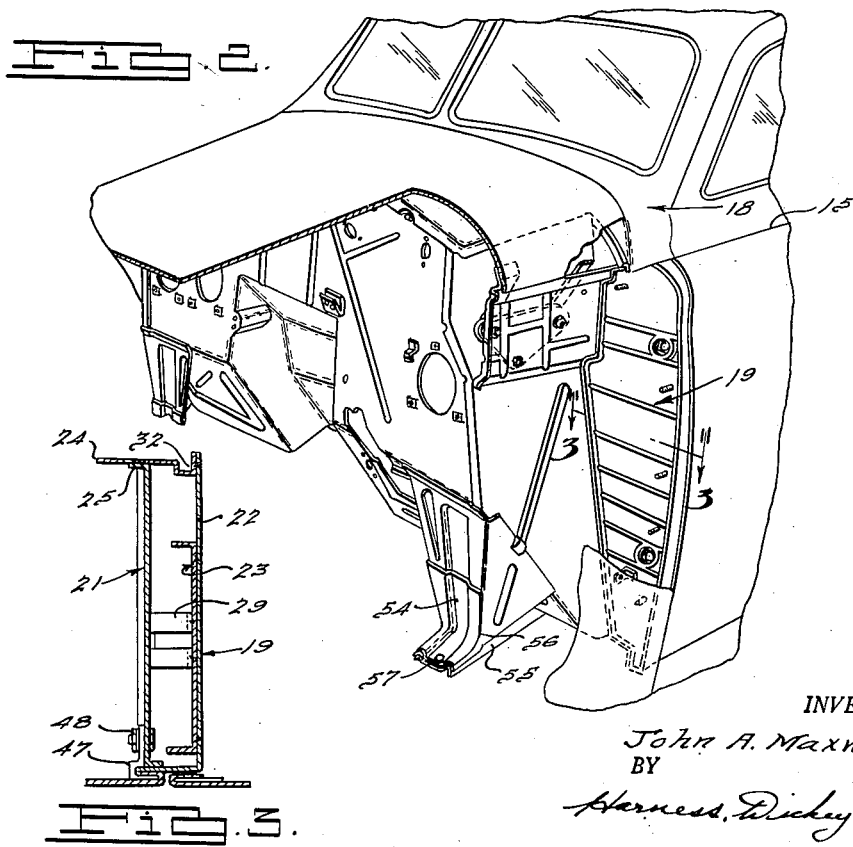
Fig. 2 is an enlarged broken view of the front pillar, cowl and windshield portion of the automobile illustrated in Fig. 1.
Fig. 3 is an enlarged sectional view of the structure illustrated in Fig. 2, taken on the line 3—3 thereof.

As illustrated in Fig. 3, the rear stamping 22 overlaps the rear edge of the side cowl panel 24 at the offset channel portion 32 thereof where the stampings are welded together. The flange 27 overlaps and is welded to the flange 26 of the stamping 21, while the flange 25 thereof is welded to the side cowl panel 24. This provides a box-section structure for the pillar portion 19 below the belt line 15 of the body. The side cowl panel 24 at the upper end is offset inwardly at 33 and has a hinge supporting bracket 34 secured to the panel and to the flange 25 of the stamping 21. The bracket is offset outwardly to provide a recess 35 for the reception of the hood hinge which is secured on the inner face of the bracket, as illustrated in Fig. 2. A plate 36 joins the rear end of the bracket 34 to the cowl panel 24 to provide strength thereto and to the pillar where it joins with the flange 25 of the front stamping 21.

The windshield reinforcing panel 37 mates with the top rear edge of the side cowl panel 24 at 38 and the windshield framing panel 39 extends over the reinforcing frame 37 and the top of the A post portion 19 below the belt line. The top flanges 20 and 41 are overlapped by the lower end 42 of the panel 39 in a slot 43 provided between the end 42 and the forward flange 44. The roof rail (not herein illustrated) joins with the stamping 22 at the projecting end 45 thereof. A plurality of frontwardly extending studs 46 are welded or otherwise secured to the stamping 21 by which the fender supporting bracket 47 is secured to the pillar portion 19 by nuts 48. Recesses 49 are provided in the stamping 21 to receive the heads of bolts which secure the portion of the hinge which projects inwardly through hinge openings 51 in the stampings 22 and 23 adjacent to the stamping 21. Outer portions of the hinges are secured to the nuts 52 carried by the stamping 23 by bolts extending through said portions of the flanges.

In the structure herein illustrated, a rigid A post is provided below the belt line of box-section construction, extending a substantial distance outwardly from the cowl panel. The outer flange on the box-section portion of the pillar forms a support for the rear edge of the fender and the front edge of the door to have the surfaces thereof in aligned relation. The A post is secured to the cowl panel and to an offset hinge bracket to provide further reinforcement for the pillar, bracket and cowl panel. The hinge plates for the hood are secured to the brackets in the spaces between the brackets and the offset portions of the side cowl panels. By providing the outward extension to the A post portion below the belt line, the front fender line is carried through the doors and the rear fender, eliminating the independent bulges to the front and rear fenders, as heretofore provided. Increased seating capacity to the body is provided by the increased space between the doors and inner body panels and the center of mass is lowered, providing greater stability to the automobile. The forward edge of the cowl panel is provided with forwardly projecting braces 54 reinforced by an element 55 extending forwardly from beneath the floor and by an arcuate element 56. An aperture 57 extends through the brace and elements to mate with an aperture in the chassis frame, the forward end of the body being secured to the chassis frame by bolts extending through the apertures.

What is claimed is:

1. In an automobile body, a forward cowl portion having side cowl panels offset inwardly at the top, brackets secured to said side cowl panels in spaced relation to the inwardly offset cowl portions to form channel-like recesses open at the front and top for the reception of hood hinges, and a front door post portion secured to the side cowl panel and to the bracket to provide reinforcement therefor.

2. A front door post for a vehicle body disposed below the belt line thereof including a forward and rearward stamping having flanges in the outer end which overlap and space the two stampings from each other, a side cowl panel joined to the inner spaced ends of the stamping to form a box-section construction, a reinforcing stamping secured to the rearward stamping to provide reinforcement therefor, and a hinge supporting bracket secured to each side cowl panel in spaced relation thereto forming a channel open at the front and top for the reception of a hood hinge, the rear end of said bracket being secured to the upper portion of the front stamping of said post portion.

JOHN A. MAXWELL.

REFERENCES CITED

The following references are of record in the file of this patent:

UNITED STATES PATENTS

| Number | Name | Date |
|---|---|---|
| D. 115,177 | Teague et al. | June 6, 1939 |
| D. 139,636 | Walker | Dec. 5, 1944 |
| 1,179,376 | Ritter | Apr. 11, 1916 |
| 1,631,269 | Jaray | June 7, 1927 |
| 2,036,813 | Kraeft | Apr. 7, 1936 |
| 2,054,951 | Saives | Sept. 22, 1936 |
| 2,084,572 | Breer | June 22, 1937 |
| 2,114,830 | Carr | Apr. 19, 1938 |
| 2,115,903 | Breer et al. | May 3, 1938 |
| 2,167,664 | Matthews | Aug. 1, 1939 |
| 2,188,891 | Haltenberger | Jan. 30, 1940 |
| 2,248,319 | Waterhouse, Jr. | July 8, 1941 |
| 2,404,870 | Ulrich | July 30, 1946 |
| 2,488,471 | Kramer et al. | Nov. 15, 1949 |
| 2,520,074 | Wernig et al. | Aug. 22, 1950 |

FOREIGN PATENTS

| Number | Country | Date |
|---|---|---|
| 870,108 | France | Dec. 5, 1941 |

OTHER REFERENCES

"Auto-Carrosserie" No. 128, Mar.–Apr. 1937.